United States Patent [19]

Peterson et al.

[11] 4,291,925

[45] Sep. 29, 1981

[54] LAMINATED BEARINGS WITH DUAL STOCK LAYERS

[75] Inventors: Robert R. Peterson, Hudson; Daniel S. Ventura, Malden, both of Mass.

[73] Assignee: Barry Wright Corporation, Watertown, Mass.

[21] Appl. No.: 61,009

[22] Filed: Jul. 26, 1979

[51] Int. Cl.³ .............................................. F16C 27/08
[52] U.S. Cl. ...................................... 308/26; 308/2 A; 308/163
[58] Field of Search ............... 308/26, 2 A, 2 R, 135, 308/163, 237 R, DIG. 8

[56] References Cited

U.S. PATENT DOCUMENTS

| | | | |
|---|---|---|---|
| 3,958,840 | 5/1976 | Hickox | 308/2 A |
| 4,040,690 | 8/1977 | Finney | 308/26 |
| 4,105,266 | 8/1978 | Finney | 308/26 |

Primary Examiner—Lenard A. Footland
Attorney, Agent, or Firm—Milton E. Gilbert; Gary E. Ross

[57] ABSTRACT

A frusto-conical laminated elastomeric bearing is provided wherein at least some of the layers are graded in composition so that they have a first relatively high modulus of elasticity at the inner circumference, and a second relatively low modulus of elasticity at the outer circumference, with the grading being arranged so as to provide an optimum balance of strain distribution and spring rates consistent with bearing lifetime and reduced-torque considerations.

6 Claims, 2 Drawing Figures

LAMINATED BEARINGS WITH DUAL STOCK LAYERS

This invention relates to laminated bearings and in particular to bearings of the type comprising alternating bonded layers of a resilient material such as an elastomer and a nonextensible material such as a metal.

It is well known that the load carrying capacity of a layer of resilient material may be increased many times by subdividing it into a plurality of layers and separating the layers by intervening layers of a non-extensible material. At the same time, however, the ability of the resilient material to yield in shear in a direction parallel to the layers is substantially unaffected. This concept has been utilized in the design of a wide assortment of bearings, as exemplified by the following U.S. patents: Finney, U.S. Pat. No. 4,105,266; Finney, U.S. Pat. No. 4,040,690; Johnson, U.S. Pat. No. 3,807,896, Peterson, U.S. Pat. No. 3,792,711; Dolling, U.S. Pat. No. 3,941,433; Schmidt, U.S. Pat. No. 3,679,197; Lee et al, U.S. Pat. No. 3,429,622; Boggs, U.S. Pat. No. 3,377,110; Orain, U.S. Pat. No. 2,995,907; Krotz, U.S. Pat. No. 3,179,400; Hinks, U.S. Pat. No. 2,900,182; and Wildhaber, U.S. Pat. No. 2,752,766; and the prior art cited in each of those patents.

A significant commercial variety of laminated bearings is characterized by the alternating bonded lamellae being disposed concentrically about a common center, i.e., so that successive alternating layers of resilient and non-extensible materials are disposed at successively greater radial distances from the common center. This variety of bearings includes a number of different configurations, notably bearings which are cylindrical or conical (usually, frusto-conical) in shape or which are essentially sectors of cylinders, cones and spheres.

The behavioral characteristics of laminated bearings have resulted in their commercial acceptance in different forms for a variety of applications, notably in helicopters. By way of example, conically shaped bearings are used as main rotor feathering bearings. In such application the conically shaped bearings are required to accommodate cyclic torsional motion about the center axis thereof while simultaneously carrying a large compressive load along that same axis. With such bearings greater compressive stresses and compression induced shear strains are established in (a) the resilient layers which are closest to the common center and (b) those portions of the resilient layers which are closest to the common center, with the result that failure from fatigue encountered in accommodating the combined situation of loading and torsional motion tends to occur at the innermost resilient layer and especially the inner edge portions of the resilient layers. In this connection it is to be noted that the edges of the elastomer layers tend to bulge from between the adjacent non-extensible laminations under compressive loading, thereby adversely effecting bearing fatigue. The extent of bulging depends on the shape factor but in any event the bulging and hence the wear problem tends to be more severe at the apex (inner circumference) edges than at the base (outer circumference) edges of conically-shaped bearings due to the higher strain levels in the apex region. Accordingly the bearing failure usually is the result of extrusion and erosion or fatigue of the elastomer layers at their inner edges.

The fundamental design criterion of all elastomeric bearings is that they carry loads in compression and accommodate motions in shear. In addition to concern for size and cost considerations, it is desirable to maximize the compressive load capacity of such bearings without adversely affecting the torsional spring rate and in particular the ability of the bearing to undergo torsional displacement under different magnitudes of alternating motion. At the same time, it is desirable to avoid or reduce any undesirable impact on strain distribution. Attainment of an optimum combination of load-carrying capability, spring rate and torsional shear strain distribution is complicated by a number of factors. One such factor is that elastomeric materials exhibit changes in modulus of elasticity over a range of strain magnitudes and, depending upon the composition of the material, the strain distribution in a layer of elastomeric material may vary greatly over a given spectrum of input conditions i.e., different static and dynamic loads and motions. Another factor is that the strain distribution may tend to change within a particular layer and also on a layer-to-layer basis under different input conditions. In this connection it should be noted, by way of example, that a conical bearing employed in a helicopter main rotor retention system is required to undergo dynamic or static torsional deflection simultaneously with dynamic or static compressive loading. The shear strain produced by torsional deflection is not uniformly distributed and will vary in distribution as a function of the magnitude of torsional deflection. Additionally shear strains are induced by application of compressive loads (either axial or radial) and such induced shear strains are maximum at the edges of the elastomer layers located along the inner circumference of the bearing and also tend to vary with the magnitude of the compressive load.

As a consequence laminated bearings tend to exhibit changes in spring rate or stiffness under different static loads or varying magnitudes of alternating motion. While the strain behavior and ultimate wear may be modified by simply replacing a given elastomer with another having a different modulus of elasticity, that approach is not preferred since it may disadvantageously affect either the torsional spring rate or the torsional strain distribution. In the typical helicopter application, the spring rate of a bearing operating in shear usually is required to be within specified limits. Thus, increasing the spring rate may not be acceptable since it may result in having to concomittantly increase the power capability of an actuator or other device which is coupled to the bearing, and/or a decrease in the useful life of the actuator. Furthermore, the bulging phenomenon at the outer circumference of a conical bearing may not be sufficiently severe as to require any change in modulus. On the other hand a change in modulus may increase the torsional spring rate at the outer circumference beyond acceptable limits. In this connection it should be noted that, on the basis of computer finite element analysis of the elastomer layers of a conical bearing, increasing the modulus of an elastomer layer will produce a greater contribution to the torsional spring rate of an element of the layer located at its base end than an element of the same length located at its apex end, due to the difference between the effective radii of such elements. Hence merely changing the modulus of each layer to reduce the compression-induced strains at the apex side of the bearing usually is not a practical solution since it makes it difficult to achieve an optimum combination of compression-induced edge shear strain, torsional shear strain distribution and lowest possible torsional spring rate consistant with the cost, lifetime and operating requirements of the system in which the bearing is mounted.

It has been recognized also that absolute uniformity of compression induced shear strains within an elastomer layer of a conical bearing is impossible to achieve because the strains decrease from a maximum finite value at each of its exposed edges to a minimum value at some point intermediate those edges. Nevertheless the more uniform the compression induced shear strains become between apex and base edges, the less likely that one layer will fail a substantial time before the other layers. The same is true if the torsional shear strains in adjacent layers are made more nearly the same at corresponding points. In this connection it is to be noted that because of differences between the average radius of the layers of a conical bearing, the compressionally-induced and torsional shear strains may tend to vary substantially on a layer-to-layer basis where all of the elastomer layers have the same modulus of elasticity and thickness.

Schmidt, supra, proposed to improve the fatigue life of bearings by progressively increasing the thicknesses of successive layers of resilient material with increasing radius and simultaneously to progressively decrease the modulus of elasticity of those same layers with increasing radius. However, the Schmidt technique is expensive in that it requires that each elastomer layer be made of a different material. Thus, an elastomeric bearing consisting of fifteen resilient layers necessitates provision of fifteen different elastomer materials. Even though this may be achieved by subdividing a basic elastomer feedstock into fifteen lots and modifying each lot with a different amount or type of additive, the fact remains that it is costly, time consuming and inconvenient to provide a different material for each resilient layer. Furthermore, care must be taken to assure that the materials are properly identified so that they will be correctly arranged with modulus of elasticity decreasing with increasing radius as prescribed by Schmidt. Using a relatively large number of elastomer materials as suggested by Schmidt also is disadvantageous where the bearings are to be used at relatively low temperatures, e.g., $-45°$ to $0°$ F. Since different elastomer stocks will behave differently as the temperature is lowered, only some of the elastomer layers in a bearing made according to Schmidt may work effectively while the bearing is cold, thereby inhibiting proper bearing performance and accelerating bearing deterioration due to uneven strain on a layer-to-layer basis.

In Finney, U.S. Pat. No. 4,105,266 relating to a non-conical bearing, it is suggested that by grading the elastomer layers so that they have radially varying modulii of elasticity, it is possible to minimize variations between the compression-induced shear strains at the inner and outer circumferences of the layers. Finney recommends that each layer have at least three modulii of elasticity, with the modulii decreasing progressively from zone to zone in a radial direction in each layer away from the circumferential edge of the layer which would experience the greater compression-induced shear strain if the layer had a constant nominal modulus of elasticity. Finney specifically suggests that each layer may have an inner and outer circumferential portions with modulii X and Z respectively, and center portion with a modulus Y, where $X > Y > Z$. However, Finney offers no simple solution to the problem of equalizing torsional shear strains on a layer-to-layer basis while at the same time reducing non-uniformity of compression-induced shear strains in each layer and maintaining the overall torsional spring rate of the bearing at a low level. Unlike Schmidt, supra, or Krotz U.S. Pat. No. 3,179,400, but like Dolling U.S. Pat. No. 3,941,433, Finney does not require (but does consider) variations in the relative thickness of the elastomer layers. Unlike Dolling his gradations of modulus are not always the same on a layer-to-layer basis—some layers are graded oppositely to others. Finney also suggests the use of progressively stiffer elastomers in the layers adjacent the upper end plate of his bearing and progressively softer elastomers in the layers adjacent the lower bearing end plate, so as to substantially equalize compression induced strains throughout the bearing without any substantial affect on the bearing's torsional spring rate. However, Finney's solutions appear to be limited as to spring rate control and load capacity on a layer-to-layer basis since the variations contemplated for the elastomer layers involve changes in (a) modulus grading by changing the materials used, (b) the relative position of the different modulii sections in each layer, and (c) the thickness of each layer. In all cases Finney requires three different elastomer stocks to achieve grading which will provide improved compression-induced shear strain distribution.

SUMMARY OF THE INVENTION

The primary object of this invention is to provide a method of making laminated bearings of the type described whereby a relatively large number of resilient layers each exhibiting a different effective modulus of elasticity may be provided using two different resilient stocks.

Another object is to improve the fatigue life of laminated bearings and in particular to provide an elastomeric bearing which not only combines a high compressive load to allowable shear ratio but also has an improved fatigue life at cold temperatures.

A further object is to provide a bearing in which at least some elastomeric layers have radially-varying modulii of elasticity that tend to minimize variations between compression induced shear strains at the inner and outer circumferences of each layer.

Still another object is to provide a bearing having elastomer layers of constant thickness which are formed so as to equalize strains due to torsion from layer-to-layer, thus assuring a more uniform deterioration of the layers under cyclic torsional motion.

Other more specific objects are to reduce the problem of uneven compression-induced shear strain distribution in each layer of a laminated conically-shaped bearing while allowing low values of torsional spring rate and high loading capacity to be obtained, permit optimization of strain distributions produced by torsional deflections about the bearing center axis, minimize the impact on torsional strain distribution produced from changing the torsional dynamic strain input, and avoid having to use (as required by Schmidt, supra) a large number of different elastomer stocks to optimize strain distribution.

The foregoing objects are obtained by providing as a preferred embodiment of the invention a frusto-conical laminated bearing of the type described wherein at least some of the elastomeric layers are graded in composition so that they have a first high modulus of elasticity at the apex (inner circumference) side of the bearing to restrain bulging, and a second lower modulus of elasticity at the base (outer circumference) side of the bearing in accordance with the less pronounced bulging at that side, with the grading in composition being arranged so that an optimum combination of compression-induced shear strain, torsional shear strain distribution, and lowest possible spring rates consistent with life-time consideration is obtained.

This grading is achieved by forming the elastomeric-layers so that they consist of two sections of elastomeric material laid up side by side, with the relative sizes of the two sections varying on a layer-to-layer basis so as to provide an effective or composite modulus of elasticity of selected value calculated to keep the torsional shear strain distribution constant under all input conditions with changing torsional displacement magnitude, while at the same time permitting a high compressive stiffness.

Other objects and features of the invention are described or rendered obvious by the following detailed description of a preferred embodiment of the invention and the accompanying drawing.

SPECIFIC DESCRIPTION OF THE INVENTION

Figure 1:
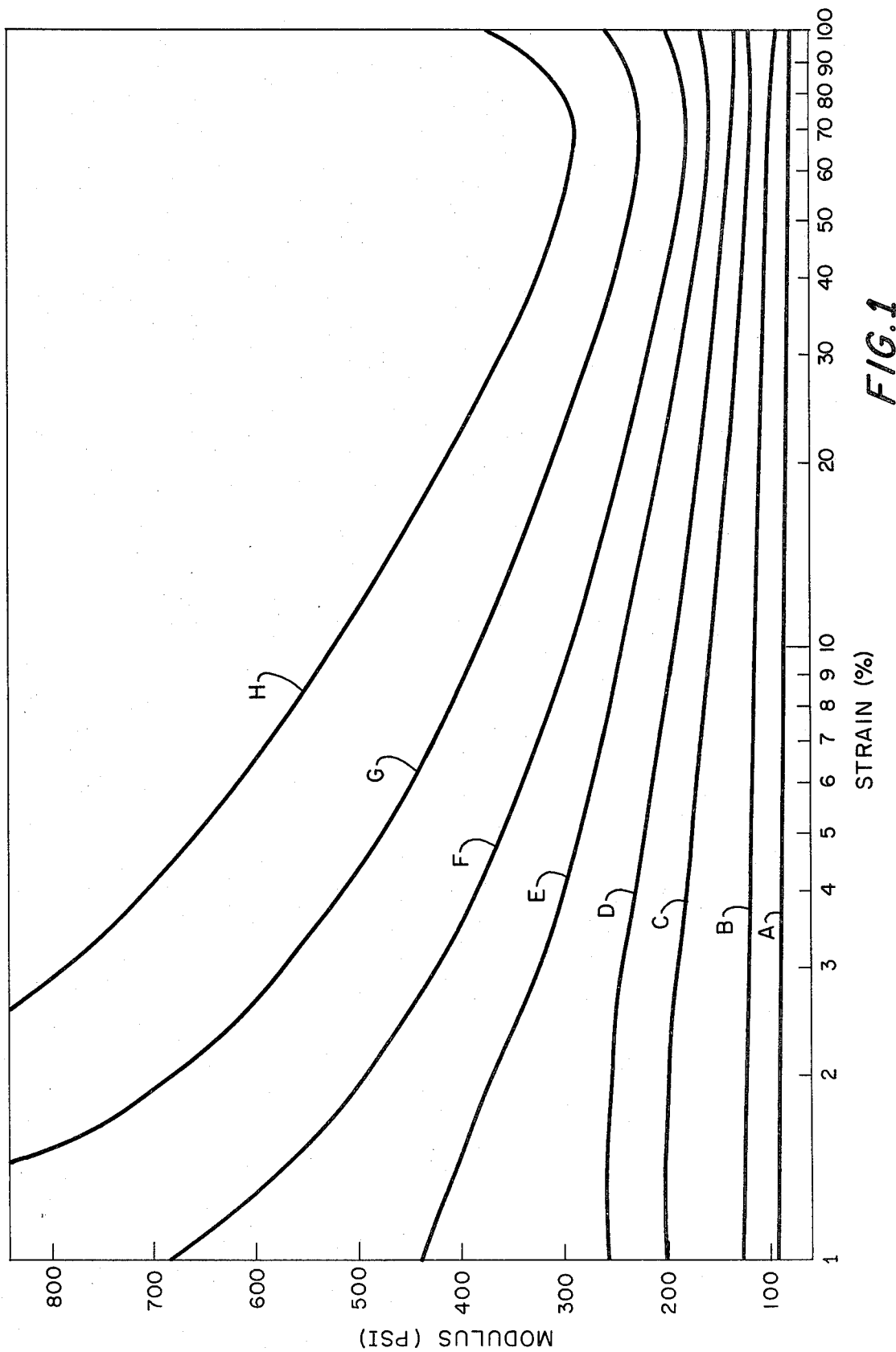
FIG. 1 is a family of curves illustrating the change in shear modulus of different elastomer stocks with changes in the strain experienced by the stocks under identical displacement conditions.

In its broadest sense the invention utilizes two elastomeric stocks, the first of relatively high modulus and the second of relatively low modulus, suitably arranged and proportioned within most or all of the elastomeric layers of a laminated bearing so as to more nearly equalize strain distribution on a layer-to-layer basis as well as providing in each layer an optimum balance of strain distribution, bulging and spring rate. The number of layers employing two different elastomer stocks and the relative widths of the elastomer stocks in each multi-stock layer, may vary according to the size and shape of the bearing, the modulus of elasticity of the elastomeric-materials used, and the loads to which the bearing is subjected. It also is contemplated that some of the layers may have sections of relatively high modulus elastomer stock (and/or of relatively low modulus stock) of identical or nearly identical widths, particularly in the outermost layers where the effective modulii of the layers may be more nearly the same since the torsional shear strain distribution is less troublesome on a layer-to-layer basis at the outer circumference of the bearing. In this connection it is to be appreciated that the modulii of elasticity of different stocks of elastomer or of different portions of an individual elastomeric layer may be affected by the use of elastomeric filler material in the fabrication of a bearing. For example, in one method of fabricating a laminated elastomeric bearing, the elastomeric layers are cut from sheets of elastomer and stacked up by hand with the layers of nonextensible materials. As heat and pressure are applied to bond the elastomeric and nonextensible laminations together, elastomer that has a modulus of elasticity equal to or different than the modulii of the elastomers in the layers may be introduced into the mold for the bearing to develop molding pressure, to fill in gaps, and to bring the elastomeric layers to full size. This transfer or filler elastomeric material may mix with the basic elastomer stocks in the layers, thereby altering their moduli of elasticity, or the filler material may form a thin layer along one or both circumferential surfaces of an annular bearing. To distinguish between (a) the modulus of elasticity of a basic elastomeric stock in a layer of elastomer, or the effective combined modulus of two different modulii basic stocks in a layer, and (b) the modulus of elasticity of the same basic stock(s) when mixed with small amounts of filler material or of the filler material itself when forming a relatively thin or narrow surface coating on the layer of basic elastomer stock(s), the modulus of elasticity of a basic stock of elastomer used in a layer of elastomer and the effective combined modulus of two different modulii basic stocks in a layer, is termed herein the "nominal" modulus of elasticity of the stock(s). The addition of small amounts of filler material is presumed not to affect the nominal modulus of elasticity to a significant extent (i.e. in a way that would defeat the purpose of the present invention). Similarly the presence of a thin coating of a filler elastomer on a layer of a basic elastomeric stock is to be ignored. Typically, filler or transfer material will compose about 15% or less of the volume of an elastomeric layer in a laminated elastomeric bearing.

FIG. 1 illustrates how the shear modulus of elasticity of a number of different elastomer compounds can vary in accordance with the torsional shear strain experienced by each elastomer. These curves were derived by subjecting specimens of each compound to displacement only in shear at 75° F. while the specimens were free of compressive loading. The several compounds were derived from a single basic rubber stock and were produced by adding different amounts of carbon to the basic stock.

As is apparent from a comparison of Curve A with curves G or H, a relatively soft (low modulus) material can accommodate varying degrees of torsional strain with less affect on its shear modulus than can a relatively stiff (high modulus) material. Thus for example, at 50% strain the differences between the shear moduli of the compounds represented by curves A and G or H is substantially less than it is at 5% strain. Stated another way, the higher the strain which it experiences, the more an elastomer with a relatively high shear modulus tends to behave like an elastomer with a relatively low shear modulus.

The present invention takes advantage of the behavior represented by the representations of FIG. 1 by making an elastomeric-bearing of two different elastomeric compounds, one selected for its characteristic of exhibiting relatively small changes in shear modulus (both static and dynamic) over a wide range of strain magnitudes, and the other selected because it exhibits greater changes in shear modulus under strain inputs in the same range of magnitudes. By appropriately proportioning the two compounds in one or more of the elastomer layers, it is possible to provide a bearing in which the distribution of torsionally-induced strain can be held nearly constant throughout the bearing for different input motions within the range of motions which the bearing is intended to accommodate, or at least as constant as in the case where, as taught by Schmidt, each resilient layer is made of a different elastomer. In the latter case each stock will exhibit a different modulus under each input condition so that optimization of strain distribution for all of the layers over the entire range of expected strain inputs is very difficult.

Figure 2:
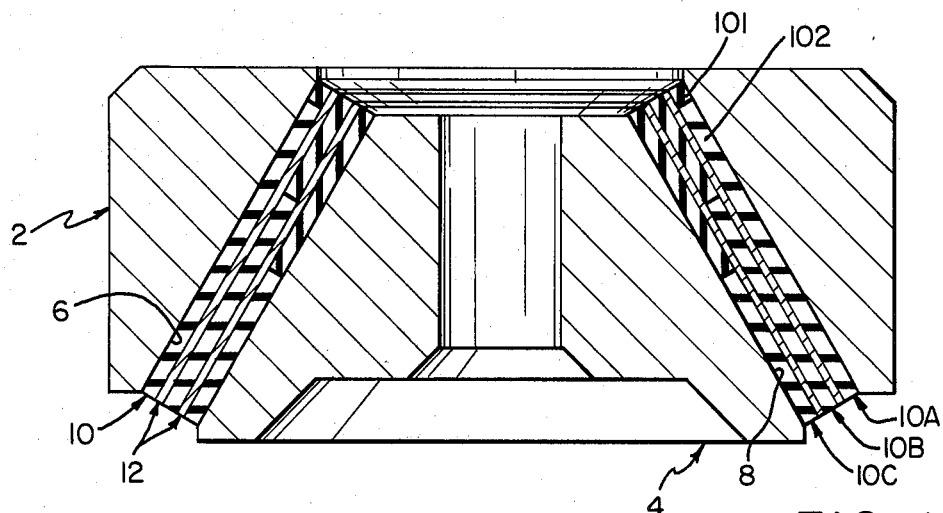
FIG. 2 is a longitudinal sectional view of the components of a conically-shaped bearing assembly made in accordance with this invention as the components appear prior to molding and the bonding of the resilient materials to the associated metal parts. In the drawing like reference numerals are used to designate like parts.

To optimize strain distribution according to this invention, each resilient layer of an intended bearing is subjected to computer finite element analysis to determine the strains in different portions of each layer for two different elastomer stocks, one having a relatively great stiffness and the other having a relatively small stiffness. The layer is analyzed at the maximum and minimum degrees of strain which the bearing will experience in its intended application, e.g., 50% and 5% strain respectively. Once the strains experienced by each computer analysis element of each layer (typically each layer is subdivided by the computer into 15 equal width elements) at maximum and minimum conditions for each of the two elastomers has been determined, it is possible to compute what proportion of the width of each layer has to be made up of each of the two elastomers in order to equalize strain on a layer to layer basis at the maximum and minimum strain inputs (as used in this context the term "width" refers to the dimension extending parallel to the layers of non-extensible material as shown in FIG. 2). The result in a conically-shaped or frusto-conical bearing is that in each dual stock layer the stiffer stock is located at the inner edge and extends toward the outer circumference while the softer stock is located at the outer edge and extends toward the inner circumference far enough to abut the stiffer stock, and additionally the width of the softer stock usually increases with the average radius of the individual layers, being greatest at the outermost dual stock layer and smallest at the innermost dual stock layer.

FIG. 2 illustrates a particular embodiment of a frusto-conical laminated bearing suitable and intended for use as a bearing in a helicopter main rotor retention system. The bearing is made by providing two annular rigid metal end members 2 and 4 which have frusto-conical inner and outer surfaces 6 and 8 respectively. In the completed bearing alternating bonded layers of a resilient material 10 and a non-extensible material 12 are disposed between end members 2 and 4, with surfaces 6 and 8 of the latter bonded to a layer of resilient material. The bearing has three layers of resilient material. The resilient material preferably is an elastomer such as a natural or synthetic rubber, but is also may be a suitable plastic material of elastomeric character. The nonextensible material may be steel or another kind of non-extensible material such as another metal (e.g. aluminum or titanium) or sheets of fiberglass or reinforced plastic. As is evident from the drawing, the layers 10 and 12 are frusto-conical in shape and extend generally parallel to and coaxial with the surfaces 6 and 8 of the two rigid metal end members.

The layers 10 and 12 are of uniform thickness, and the nonextensible layers 12 (which are commonly called shims) are thinner than the resilient layers. If desired the shims could be as thick or thicker than the resilient layers. Additionally the resilient layers are made so that they have greater stiffness at their inner circumference ends than at their outer circumference ends and so that a more uniform strain distribution is obtained in each layer and also on a layer-to-layer basis. This is achieved by making the resilient layers 10 from two different resilient stocks arranged in the manner illustrated in FIG. 2. Depending upon the required characteristics of the bearing the several elastomer layers 10 may but need not have sections of identical widths.

Referring to the drawing, the first or outermost resilient layer 10A is made up by laying onto the inner surface 6 of end member 2 two elastomeric stocks represented as frusto-conical sections 101 and 102, with section 101 being an elastomeric material having a selected relatively high modulus of elasticity, and section 102 being an elastomeric material having a modulus of elasticity which is less than the modulus of section 101. The sections are applied so that they abut one another as shown. Then a shim 12 is placed over this composite layer and the second two-section layer 10B is applied over that shim. In the illustrated embodiment, the second layer is substantially identical to the first except that the section 102 of the second layer is smaller in width than the corresponding section of the first layer. The two sections 101 and 102 of the second layer may but need not have the same overall width as the combined sections of the first layer, and the same is true of the third layer.

The third elastomeric layer 10C is prepared in the same way by first placing a second shim over the second composite layer and then laying another two-section composite layer over the second shim. In this layer the section 102 is once again smaller than section 102 of the second layer.

After the three resilient layers have been laid up, the other end member 4 is engaged with resilient layer 10C and then the assembled parts are forced together in a mold under suitable heat and pressure so as to cause the sections of each dual-section elastomer layer to bond to each other and also cause the elastomer layers to bond to the adjacent shims 12 or end members 2 or 4, as the case may be. In the completed bearing each group of resilient sections 101 and 102 is integrated to form a single resilient layer.

In the molding of the layers, additional elastomer material may be introduced into the mold for the bearing for the purpose of developing sufficient molding pressure, to fill in whatever gaps may exist between the various sections of elastomeric material, and to bring the elastomeric layers to full size. This filler or transfer elastomeric material preferably has a modulus of elasticity equal to the modulus of elasticity of the sections 102, but a larger or smaller modulus elastomeric material also may be used. In any event, as noted previously, this filler or transfer material will comprise about 15% or less of the volume of each elastomeric layer in the bearing.

The method of manufacturing described above is especially suitable where the resilient stock is an elastomer which can be fused and molded under heat and pressure. Where the resilient stock is a rubber, the bonding step involves vulcanization. Other aspects of the procedure of assembling and bonding the array of resilient layers, metal shims and the bearing members 2 and 4 are well known to persons skilled in the art of making laminated elastomeric bearings and are not described herein in detail since they are old and form no part of this invention.

As noted previously, the sections 101 and 102 are suitably arranged and proportioned in order to equalize strain distribution and provide an optimum balance of strain distribution bulging and spring rate. A relatively high modulus stock in the form of sections 101 is used at the apex or inner circumference of the bearing in order to restrain bulging at the inner edge of the bearing, since wear and shear strains induced from compression are historically highest at that edge. On the other hand, the need for bulge restriction is not as severe at the base or outer circumference of the bearing. Consequently use of a lower modulus stock 102 in that region of the bearing is feasible. As in the illustrated embodiment, the elastomer layers 10 and shims 12 may have the same width. Preferably, however, the widths of layers 10 and shims 12 decrease with increasing distance from the center axis of the bearing.

Obviously the foregoing arrangement is not the only possible way of practicing the invention since the relative proportions of the sections 101 and 102 as well as the total number of layers and the number of two-layers will depend on the size and anticipated operating conditions of the bearing and the modulii of the stock used to make the elastomeric layers. Thus it is contemplated that a bearing utilizing this invention may have a relatively large number of elastomer layers, e.g., fourteen, and that some of the layers, (e.g., those closest and/or furthest from the center axis of the bearing) may consist of a single elastomer which may be either of the elastomers used in the dual stock layers or an additional elastomer of different modulus. The relative dimensions of the sections 101 and 102 of the elastomeric layers required to achieve uniform strain distribution over the expected range of strain inputs may be determined by computer finite element analysis using a program derived from the finite element program TEX-GAP described in U.S. Pat. No. 4,105,206.

The following example illustrates a preferred form and the advantages of the present invention.

EXAMPLE

A frusto-conical bearing having three elastomeric layers as shown in the drawing may be constructed according to the present invention where the elastomer layers and the intervening metal shims have thicknesses of 0.100 and 0.050 respectively and the sections of the individual elastomer layers have widths in inches arranged as follows:

| LAYER | SECTION 101 | SECTION 102 |
|-------|-------------|-------------|
| (10A) | 0.0 | 2.18 |
| (10B) | .58 | 1.60 |
| (10C) | 1.07 | 1.11 |

In the foregoing bearing, the sections 101 are made of a material having a Young's shear modulus of elasticity of 230 psi and sections 102 having a Young's shear modulus of elasticity equal to 85 psi. The foregoing values are for nominal modulii of elasticity and each of the materials forming the sections 101 and 102 are essentially the same elastomer with the differences in modulii being achieved by varying the amount of carbon which is added to the elastomeric material.

The inner surface 6 of outer member 2 of the bearing has a diameter of 2.382 inch at one end and 4.692 inch at the other end, while the outer surface of inner bearing member 4 has a diameter of 1.690 at one end and 4.000 at the other end.

A bearing constructed according to the foregoing example will have an overall axial spring stiffness of 882,000 lb/in, an overall torsional stiffness of $$386 \frac{\text{in-lb}}{\text{Deg.}},$$

and substantially equalized shear strains from layer-to-layer, thus assuring uniform deterioration under cyclic torsional motion.

In contrast, a bearing of like size made with a different elastomer stock in each layer shows substantially the same strain in all three layers at 50% strain but substantially non-equalized strain distribution at 5% strain, due to the elastomer strain sensitivity illustrated by the curves shown in FIG. 1.

The invention may be practiced otherwise than as already described and illustrated. Thus, only some of the elastomer layers need be made in two sections, the layers could have varying thicknesses, injected filler material could be designed to function as a dam or bulge restrainer, and the bearing could have a different number of resilient layers.

The invention also may be applicable to bearings of other shapes. Thus, the bearing could be more nearly a full cone or it could be a cylindrical bearing wherein portions of the elastomer layers are disposed at an angle to the common axis, as in the bearing shown in U.S. Pat. Nos. 4,640,690 and 4,105,266 (FIG. 1). The bearings or portions thereof also may be spherical like, for example, the bearings shown in U.S. Pat. Nos. 4,105,266 (FIG. 6), 3,429,622, 3,941,433, 2,900,182 (FIG. 8) and 3,790,302 (FIG. 3, bearing unit 80) and the references cited therein. In each case, however, the same advantages may be obtained, e.g., bearings of selected compressive and torsional load characteristics can be made using only two different stocks.

Another advantage is that the invention allows the manufacture of bearings with more uniform shear strain distribution without loss of adequate control, thereby forestalling bearing failure as a result of extrusion and fretting erosion as the bearing undergoes repeated changes in loading. Additionally and equally important, it is possible to adjust the bearing torsional spring rate so as to reduce the power required to be exerted by a connected actuator or operator, e.g., a hydraulic piston, thereby contributing to the lifetime and reliability of the actuator and/or allowing the use of a smaller actuator. Still other advantages and modifications will be obvious to persons skilled in the art.

What is claimed is:

1. In a laminated bearing comprising a plurality of alternating and bonded together layers of elastomeric and substantially non-extensible material with the layers disposed about a common axis so as to permit the bearing to support compressional loads applied generally normal to said layers and torsional loads applied about said axis, each layer having with respect to said axis a radially inner circumference and a radially outer circumference, the improvement wherein at least one of said elastomeric layers consists of a first portion thereof positioned at said outer circumference having a preselected first nominal modulus of elasticity which exhibits relatively small changes in modulus over a relatively wide range of strain magnitudes and a second portion positioned at said inner circumference having a preselected second nominal modulus of elasticity which exhibits substantially larger changes of modulus over at least a portion of said range of strain magnitudes, whereby compression-induced shear strain distribution within said at least one layer is improved by said positioning of said portions, and wherein said two portions are effectively proportioned in size relative to each other within said at least one layer so as to achieve a pre-selected composite modulus of elasticity for said layer which is different from the modulus of elasticity of any other elastomeric layer and calculated to improve the uniformity from layer to layer of the bearing's torsional shear strain distribution over a range of torsional load input conditions.

2. A bearing according to claim 1 wherein said layers are frusto-conical.

3. A bearing according to claim 2 wherein said elastomeric layers are of a substantially equal and substantially constant thickness and wherein the widths of the portions determine the composite modulus of elasticity for said at least one layer.

4. A bearing according to claim 1 or 3 wherein each of the elastomeric layers has two portions, and wherein the composite modulus of elasticity of each of said elastomeric layers is different from that of the others.

5. A bearing according to claim 3 wherein the widths of the two portions are not equal.

6. A bearing according to claim 3 wherein at least some of said first and second portions are proportioned in size as a function of the distance thereof from said common axis.

* * * * *